(12) United States Patent
Solis

(10) Patent No.: US 10,810,557 B2
(45) Date of Patent: Oct. 20, 2020

(54) FINANCIAL SERVICES ECOSYSTEM

(71) Applicant: MovoCash, Inc., Palo Alto, CA (US)

(72) Inventor: Eric A. Solis, Palo Alto, CA (US)

(*) Notice: Subject to any disclaimer, the term of this patent is extended or adjusted under 35 U.S.C. 154(b) by 0 days.

(21) Appl. No.: 16/156,274

(22) Filed: Oct. 10, 2018

(65) Prior Publication Data

US 2019/0043026 A1 Feb. 7, 2019

Related U.S. Application Data

(63) Continuation of application No. 14/575,953, filed on Dec. 18, 2014, now Pat. No. 10,127,528.

(Continued)

(51) Int. Cl.
| | |
|---|---|
| *G07B 17/00* | (2006.01) |
| *G06Q 20/06* | (2012.01) |
| *G06Q 20/02* | (2012.01) |
| *G06Q 20/40* | (2012.01) |
| *G06Q 20/10* | (2012.01) |
| *G06Q 20/22* | (2012.01) |
| *G06Q 20/38* | (2012.01) |
| *G06Q 30/06* | (2012.01) |

(Continued)

(52) U.S. Cl.
CPC ......... *G06Q 20/065* (2013.01); *G06Q 20/023* (2013.01); *G06Q 20/027* (2013.01); *G06Q 20/10* (2013.01); *G06Q 20/102* (2013.01); *G06Q 20/12* (2013.01); *G06Q 20/227* (2013.01); *G06Q 20/383* (2013.01); *G06Q 20/385* (2013.01); *G06Q 20/40* (2013.01); *G06Q 30/06* (2013.01); *G06Q 40/02* (2013.01)

(58) Field of Classification Search
CPC ... G06Q 20/065; G06Q 20/023; G06Q 20/027
USPC ...................................... 705/16, 30
See application file for complete search history.

(56) References Cited

U.S. PATENT DOCUMENTS

| | | | |
|---|---|---|---|
| 5,465,206 A | 11/1995 | Hilt et al. | |
| 6,012,048 A | 1/2000 | Gustin et al. | |

(Continued)

FOREIGN PATENT DOCUMENTS

| | | |
|---|---|---|
| AU | 2005211762 A1 | 8/2005 |
| CN | 101990772 A | 3/2011 |

(Continued)

OTHER PUBLICATIONS

National Intellectual Property Administration, PRC; Second Office Action for CN201480076099.1; dated Jun. 20, 2019.

(Continued)

*Primary Examiner* — Rokib Masud
(74) *Attorney, Agent, or Firm* — Stetina Brunda Garred & Brucker

(57) ABSTRACT

A financial services ecosystem for providing a collaborative worldwide payment system includes: a computer-based system configured to credit a merchant, by way of a merchant bank, for goods sold or services rendered to a consumer; and a payment process platform configured to receive data from a user application. The payment process platform is configured to generate a disposable bank identification number (BIN). The disposable BIN is converted from a BIN issued by a financial institution or credit card company. The disposable BIN is used by a biller as an authorization BIN to document that the consumer has paid a bill.

20 Claims, 12 Drawing Sheets

Related U.S. Application Data

(60) Provisional application No. 61/919,350, filed on Dec. 20, 2013, provisional application No. 61/951,687, filed on Mar. 12, 2014, provisional application No. 61/988,793, filed on May 5, 2014.

(51) Int. Cl.
*G06Q 40/02* (2012.01)
*G06Q 20/12* (2012.01)

(56) References Cited

U.S. PATENT DOCUMENTS

| | | | |
|---|---|---|---|
| 6,173,272 B1 | 1/2001 | Thomas et al. | |
| 7,398,253 B1 | 7/2008 | Pinnell | |
| 7,988,040 B2 | 8/2011 | Randazza et al. | |
| 8,301,500 B2 | 10/2012 | Pharris | |
| 8,352,368 B2 | 1/2013 | Carlson et al. | |
| 8,489,483 B1 | 7/2013 | Gillin et al. | |
| 8,694,431 B1 | 4/2014 | Allen et al. | |
| 9,818,113 B2 | 11/2017 | Park et al. | |
| 2005/0177510 A1 | 8/2005 | Hilt et al. | |
| 2007/0255620 A1* | 11/2007 | Tumminaro | G06Q 20/322 705/14.27 |
| 2008/0040265 A1 | 2/2008 | Rackley, III et al. | |
| 2009/0182634 A1* | 7/2009 | Park | G06Q 20/32 705/14.36 |
| 2009/0254440 A1 | 10/2009 | Pharris | |
| 2009/0254479 A1 | 10/2009 | Pharris | |
| 2010/0076880 A1 | 3/2010 | Williams et al. | |
| 2012/0011059 A1 | 1/2012 | Hirson | |
| 2012/0066422 A1* | 3/2012 | Monks | G06F 13/4004 710/105 |
| 2012/0197801 A1 | 8/2012 | Jimenez | |
| 2012/0215688 A1* | 8/2012 | Musser | G06Q 20/102 705/40 |
| 2012/0233073 A1* | 9/2012 | Salmon | G06Q 20/381 705/44 |
| 2013/0085938 A1 | 4/2013 | Stone et al. | |
| 2013/0262296 A1 | 10/2013 | Thomas et al. | |
| 2013/0317984 A1* | 11/2013 | O'Leary | G06Q 20/10 705/40 |
| 2013/0325680 A1* | 12/2013 | Satyavolu | H04M 15/8044 705/35 |
| 2014/0019360 A1 | 1/2014 | Yang | |
| 2015/0269562 A1* | 9/2015 | Wang | G06Q 20/348 705/41 |
| 2017/0124641 A9 | 5/2017 | Stone et al. | |

FOREIGN PATENT DOCUMENTS

| | | |
|---|---|---|
| KR | 20020096353 A | 12/2002 |
| KR | 101330943 B1 | 11/2013 |
| WO | 2010045108 A2 | 4/2010 |
| WO | 2010045108 A3 | 7/2010 |

OTHER PUBLICATIONS

First Office Action for Chinese Application No. 201480076099.1; dated Nov. 20, 2018.

Extended European Search Report for EP14871942.0; dated Jul. 13, 2017.

Smart Card Alliance, "A Guide to Prepaid Cards for Transit Agencies," Feb. 2011, 38 pages.

Axis Bank, "Axis Bank Launches e-Gift Card," Dec. 17, 2012, 2 pages.

Finovate Blog, "The CSI globalVCard is a Mobile Payments App for Businesses," 2012, 5 pages https://finovate.com/the-csi-globalvcard-by-mastercard-is-a-mobile-payments-app-for-businesses/.

Taddesse, Wondwossen et al. United Nations Economic Commission for Africa, "e-Payment Challenges and Opportunities in Ethiopia," Oct. 2005, 59 pages.

Linn, Courtney J. "Regulating the Cross-Border Movement of Pre-Paid Cards," Journal of Money Laundering Control, vol. 11, No. 2. 2008, 26 pages.

First Office Action for Indian Application No. 201647023041; dated Jul. 31, 2020.

* cited by examiner

Load From Bank

Easily cash in or out from a savings or checking account to your EFS Cash account. The amount entered will be automatically transferred witin 4-7 business days.

Note: To use this service you must have a registered bank account. Click here to register.

MovoPay Details

Bank Account Number ⟵ 410a

Bank Account * ⟵ 412
[Select Bank Account ▾]

Legal Name on Bank Account * ⟵ 410b

Bank Account Type * ⟵ 410c

Bank Name ⟵ 410d

Bank Routing Number * ⟵ 410e

EFS Cash (To) * ⟵ 414
[Select EFS Cash Account ▾]

Debit Amount * ⟵ 410f

Transfer Frequency ⟵ 416
[One time, right now ▾]

Comments ⟵ 410g

FIG. 4A

My Bank Accounts
Easily add, delete or change bank account information. Add additional accounts by clicking on the "Create Bank to Card Account" link.

Create Bank to Card Account : [G]  |  Create Card to Bank Account : [Z]

| My Bank Accounts | | | | | | | |
|---|---|---|---|---|---|---|---|
| Account Nickname | Account No. | Account Type | Routing No. | Type | Status | Comments | Actions |
| Test Bank Account | *6789 | Checking | 121000358 | [G] | Verified | Testing | Edit \| Delete |

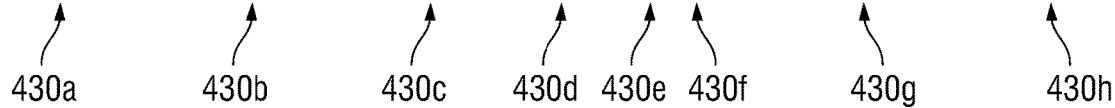

Load From Cards
Easily load funds from your credit or debit account. Your funds will automatically be transferred.

Note: A transfer fee may be applied to load funds from a credit or debit card. For more information, please refer to the Terms and Conditions.

| 1. > Enter Credit / Debit Card Information | 2. Verify & Submit |

Credit / Debit Card Information

Card Number *
[_____] /‍—450a

Expiration Date * /—452a     /—452b          Security Code *
[Select Month ∨] [Select Year ∨]              [_____] 

Transfer to EFS Cash Account *  /—452c        450b
[Select EFS Cash Account ∨] (?)

Amount *
[_____] /—450c

First Name (on card)          Last Name (on card)
ERICA                         SOLIS Address Line 1                Address Line 2
1300 Island Drive    454      Suite 105

City                          State
Redwood                       CA

Zip Code                      Country
94065                         USA
                     450d
Comments
[_____]

FIG. 4C

Pay Friends & Family
Pay your friends and family by filling in the Detail fields shown below. The amount entered in the EFS Pay Details will automatically be sent. Fields marked with * must be filled.

EFS Pay Details

EFS Cash (From) * — 910a
[Select EFS Cash Account ▼] ⓘ

EFS Cash (To) * — 910b
[Select EFS Cash Account ▼] ⓘ

Amount *
[_____] — 912a

Transfer Frequency
[One time, right now ▼] — 910c

Comments
[_____] — 910d

[Send] [Clear]
 914a    914b

FIG. 9

Cash out to Bank

Funds can be transferred from a card account to a bank account by filling in the Transfer Detail fields shown below. The Amount entered will be automatically withdrawn from your card account and transferred into the bank account selected within 2-7 business days. Fields marked with * must be filled.

Note: To use this service you must have a registered bank account. Click here to register.

EFS Pay Details

EFS Cash (From) *   —1010a
[Select EFS Cash Account ▾]

Transfer to Account Number *   —1012a   Bank Account   —1010b
[                    ]                   [Select Bank Account ▾]

Legal Name on Bank Account *—1012b   Bank Account Type *   —1012c
[                 ] (?)               [                 ]

Bank Name   —1012d   Bank Routing Number *
[                 ]   [            ] (?)
                                1012e
Debit Amount *   —1012f
[            ] (?)

Transfer Frequency
[One time, right now ▾]   —1010c

Comments
[                    ]
[                    ]—1012g

FIG. 10

FINANCIAL SERVICES ECOSYSTEM

CROSS-REFERENCE TO RELATED APPLICATIONS

The present application is a continuation of U.S. patent application Ser. No. 14/575,953, filed on Dec. 18, 2014, which claims priority to, and the benefit of, U.S. Provisional Application Ser. No. 61/919,350, filed on Dec. 20, 2013, U.S. Provisional Application Ser. No. 61/951,687, filed on Mar. 12, 2014, and U.S. Provisional Application Ser. No. 61/988,793, filed on May 5, 2014, the disclosures of all of which are herein incorporated by reference in their entireties.

STATEMENT RE: FEDERALLY SPONSORED RESEARCH/DEVELOPMENT

Not Applicable

BACKGROUND OF THE INVENTION

Technical Field of the Invention

The present disclosure relates generally to the processing of financial transactions. More particularly, the present disclosure relates to a financial services ecosystem for payments and emerging commerce.

Description of the Related Art

Fundamental to the functioning of the economy is the exchange of payment for goods and services. Throughout modem commercial history, payment has typically been rendered with money in the form of currency or cash such as bank notes and coins. In the economy, cash continues to be widely used to purchase goods and services, but it is oftentimes inconvenient. In the United States, a study by Tufts University concluded that the cost of using cash amounts to around $200 billion per year. This is primarily the costs associated with collecting, sorting and transporting the physical currency, but also includes expenses like automated teller machine (ATM) fees. The study also found that the average American wastes five and a half hours per year withdrawing cash from ATMs, which is just one of the many inconvenient aspects of physical currency. Physical currency is often unhealthy too. Researchers in Ohio spot-checked cash used in a supermarket and found 87% contained harmful bacteria.

Conventional financial transactions are fundamentally based on the value of currency, but often involve the transfer of funds that do not require the physical exchange of cash. One common type of payment is by check, which is a negotiable instrument that instructs a financial institution to pay a specific amount of currency from a designated account of an account holder (or drawer) to a payee that is specified on the check. Typically, the payee deposits the check at his own financial institution that may not necessarily be the same as that of the drawer. The payee's financial institution then initiates a request to the drawer's financial institution for a transfer of the specified amount with the routing number and account number on the check while provisionally crediting the account of the payee. The check is cleared once the funds have been transferred from the payee's financial institution to the drawer's financial institution, with appropriate debits and credits being made to the accounts of the payee and drawer.

The Federal Reserve Bank's Automated Clearing House (ACH) Network is a processing and delivery system that provides for the distribution and settlement of electronic credits and debits among financial institutions, and functions as an electronic alternative to paper checks. The ACH Network is governed by the NACHA Operating Rules, which define the roles and responsibilities of financial institutions and other ACH Network participants. Typically, five participants are involved in an ACH transaction: (i) the originating company or individual (Originator); (ii) the Originating Depository Financial Institution (ODFI); (iii) the ACH Operator; (iv) the Receiving Depository Financial Institution (RDFI); and (v) the receiving company, employee or customer (Receiver). The Federal Reserve and Electronic Payments Network act as ACH Operators, i.e., central clearing facilities through which financial institutions transmit or receive ACH entries. In ACH terminology, Originator and Receiver refer to the participants that initiate and receive the ACH entries rather than the funds. Unlike a check, which is always a debit instrument, an ACH entry may be either a credit or a debit entry.

ACH transactions are typically categorized as either consumer payments or corporate payments, depending on the relationship of the parties involved in the transaction and the type of Receiver account. In addition, payments are distinguished as Federal Government payments (representing automated disbursements originating from the United States Government, such as Social Security benefits, military and civilian payrolls, retirement benefits, tax refunds, and disbursements for state and federal revenue sharing programs) or commercial payments (initiated by both individual consumers and corporations). Consumer payments made via the ACH Network may include credit applications such as payroll, retirement, dividend, interest, and annuity payments, in addition to educational benefit reimbursements, payments and advances, and many others. Consumer ACH debit applications include, among others, the collection of insurance premiums, mortgage and rent payments, utility payments, installment payments, a variety of membership dues, and other recurring obligations. The ACH Network is also widely used to settle consumer transactions made at ATMs and point-of-sale (POS) terminals. Corporate ACH applications may include cash concentration and disbursement, corporate trade payments, state and Federal tax payments and financial electronic data interchange (EDI).

Physical currency is already being replaced by cryptocurrencies like Bitcoin. Bitcoin allows for direct transfers of funds between parties, without the need for a third party. A wide range of startups are now developing products based on the Bitcoin protocols, on the hope that it will compete with other global payment systems. Cash transactions worldwide rose just 1.75% between 2008 and 2012, to $11.6 trillion. Meanwhile, non-traditional payment methods rose almost 14% to total $6.4 trillion. This group includes online and mobile payment systems including PayPal, Google Wallet, Apple Passbook, and all modern cashless alternatives.

PayPal is an online payment service that enables businesses, as well as individuals, to accept bank or credit card payments for the items they sell. When a customer pays for his or her purchases, PayPal processes the payment and transfers the funds to the seller's PayPal account. PayPal also offers a start-to-finish shopping cart and checkout system. PayPal facilitates online payments for hundreds of thousands of Internet e-commerce ventures, as well as traditional brick-and-mortar businesses that have an online presence.

Google Wallet is a mobile payment system developed by Google that allows its users to store debit cards, credit cards, loyalty cards, and gift cards among other things, as well as redeeming sales promotions on their mobile phone. Google Wallet can use near field communication (NFC) to make payments by simply tapping the phone on any PayPass-enabled terminal at checkout. On May 15, 2013, Google announced the integration of Google Wallet and Gmail, allowing users to send money through Gmail attachments.

Apple's Passbook relies on scanning 2D barcodes to help users manage their movie, concert and airline tickets as well as loyalty cards and coupons for selected merchants. The result: Users receive location and time-based notifications when they are near a cafe where the loyalty card can be used or when the airline, movie or concert ticket is nearing its due date.

Venmo is touted as a "next generation checking account" that allows users to take money out of a PayPal digital wallet, a bank account, or a credit card balance and send it to someone digitally. Like Apple Pay and PayPal itself, Venmo gives users a digital wallet that can be used to access cash in a bank account. The difference is that the wallet can be shared over a social network. Those on the network can take money out or put money in. For example, a group of people can use it to pay for food and beverages on a night out on the town. Users cannot use Venmo to pay their bills or buy an item at a store: unlike Apple Pay, no cash register accepts it.

Thrive Analytics 2014 Digital Wallet Usage Study revealed that, despite nearly 80% of consumers being aware of digital wallets, including major players like PayPal, Google Wallet, and Apple Passbook, security concerns remain the main barrier to adoption, followed by lack of usability versus credit cards/cash (37%) and not being top of mind as a form of payment at the time of purchase (32%). Meanwhile, MasterCard and Visa are both facing their fair share of obstacles as they try to become players in the digital wallet game. Both Visa and MasterCard have a connection to an issuer and a connection to a merchant bank, but neither one of them has a direct connection to either side of the purchase.

Square, Inc. produces a digital cash register application called the Square Register, which works with Square Reader to turn a smartphone or tablet into a mobile point of sale. That way any business can accept credit cards using it. Square's peer-to-peer money exchanging app, Square Cash, is a payments app similar to Venmo and Apple Pay. Snap-Cash is a variation of Square Cash reengineered to work over the popular social network Snapchat. In other words, its Square's answer to Venmo. One difference is that it can work with merchants that use Square.

On the whole, cash is expensive, inconvenient, wasteful and unhealthy. Even though much of the world's population has access to many different options for making payments other than cash, cash still persists. When one considers that the entire card payment industry, including American Express, Visa and MasterCard (companies with combined assets of over $200 billion), has not managed to eclipse cash payments in 60 years of existence, it becomes apparent that progress towards more cashless economies requires new and innovative cashless payment solutions. Accordingly, a need exists for innovative payment solutions for the distribution and settlement of electronic credits and debits.

BRIEF SUMMARY OF THE INVENTION

According to an aspect of the present disclosure, a financial services ecosystem for providing a collaborative world-wide payment system is provided. The financial services ecosystem includes: a computer-based system configured to credit a merchant, by way of a merchant bank, for goods sold or services rendered to a consumer; and a payment process platform configured to receive data from a user application. The payment process platform is configured to generate a virtual, tokenized and disposable card bank identification number (BIN). The virtual, tokenized and disposable card BIN is converted from a BIN issued by a financial institution or credit card company. The virtual, tokenized and disposable card BIN is used by a biller as an authorization BIN to document that the consumer has paid a bill.

The user application may be configured to allow the consumer to select and fund one or more financial instruments within the financial services ecosystem. The one or more financial instruments may include Electronic Currency, Card-Linked Digital Card, Universal BIN Plastic Digital Card, Cell Repository, Micro-Payments, 3DCash, Hyper Gift Card BIN, and/or Branded Pay Card.

According to another aspect of the present disclosure, a system is provided that includes a processor and a tangible, non-transitory memory communicatively coupled to the processor. The processor is communicatively coupled to the Automated Clearing House (ACH) network and operable to retrieve information including a virtual, tokenized and disposable card bank identification number (BIN). The virtual, tokenized and disposable card BIN is tracked for reconciliation while the consumer remains anonymous. The tangible, non-transitory memory has instructions stored thereon that, in response to execution by the processor, cause the processor to be capable of performing operations including: creating an open file for use to match outstanding virtual, tokenized and disposable card BINs for reconciliation with incoming ACH transactions being received from a bank account associated with the consumer.

In yet another aspect of the present disclosure, a method for the distribution and settlement of electronic credits and debits is provided. The method includes receiving, on a user computing device, a virtual, tokenized and disposable card BIN, wherein the virtual, tokenized and disposable card BIN is created from a primary account number (PAN) BIN issued by a financial institution or credit card company; funding an electronic account associated with a consumer; generating an electronic entity including the virtual, tokenized and disposable card BIN and having a monetary value associated therewith, the monetary value being secured by the electronic account; and creating an open file for use to match outstanding virtual, tokenized and disposable card BINs for reconciliation with incoming ACH transactions being received from a bank account associated with the user.

BRIEF DESCRIPTION OF THE DRAWINGS

Objects and features of the presently-disclosed financial services ecosystem will become apparent to those of ordinary skill in the art when descriptions of various embodiments thereof are read with reference to the accompanying drawings, of which:

FIG. 4A is a display screen view of a mobile device application in accordance with an embodiment of the present disclosure;

FIG. 4B is a display screen view of a mobile device application in accordance with an embodiment of the present disclosure;

FIG. 4C is a display screen view of a mobile device application in accordance with an embodiment of the present disclosure;

FIG. 9 is a display screen view of a mobile device application in accordance with an embodiment of the present disclosure; and FIG. 10 is a display screen view of a mobile device application in accordance with another embodiment of the present disclosure.

DETAILED DESCRIPTION OF THE INVENTION

Figure 1:
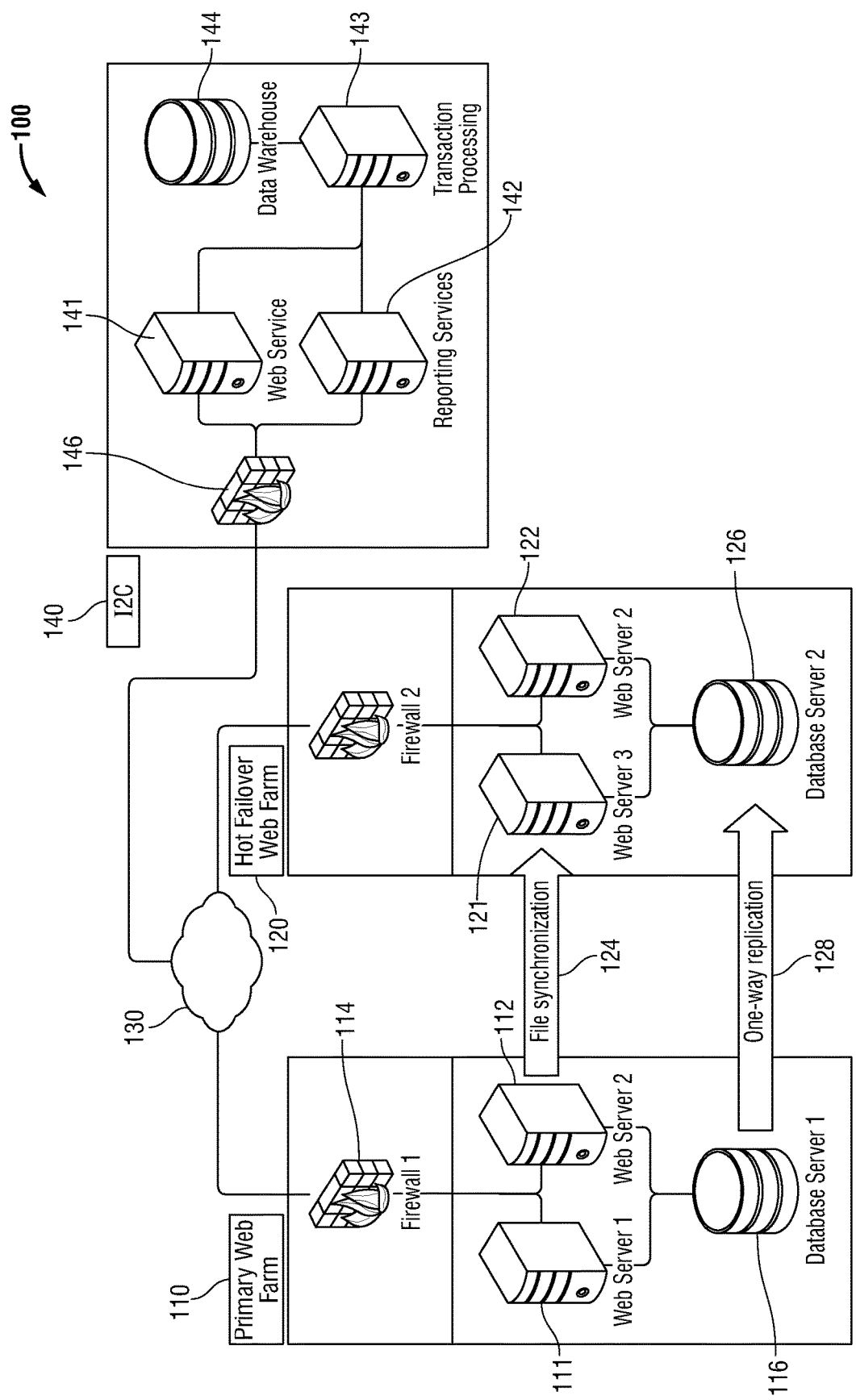
FIG. 1 is a block diagram of a typical system environment in which various embodiments of the present disclosure may be implemented.

Hereinafter, embodiments of a financial services ecosystem are described with reference to the accompanying drawings. Like reference numerals may refer to similar or identical elements throughout the description of the figures.

This description may use the phrases "in an embodiment," "in embodiments," "in some embodiments," or "in other embodiments," which may each refer to one or more of the same or different embodiments in accordance with the present disclosure.

Various embodiments of the present disclosure provide a financial services ecosystem for payments and emerging commerce. Embodiments of the presently-disclosed financial services ecosystem provide a synthetic financial instrument to speed up the distribution and settlement of electronic credits and debits, while simultaneously creating a notification to a biller record keeping system. Embodiments of the presently-disclosed financial services ecosystem provide a collaborative worldwide payment system and solution to reach stakeholders in the ecosystem, such as consumers, merchants, banks and payment networks. Embodiments of the presently-disclosed financial services ecosystem use an amalgamation of Bank Identification Numbers (BINs), omnibus accounts, credit card rails, cellular technology, mobile devices and applications, electronic currency, sub accounts, the worldwide web, cloud technologies, Automated Clearing House (ACH) and other systems and processes that may be modified from their original or traditional form.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. The present disclosure may take the form of a computer program product on a computer-readable storage medium having computer-readable program code means embodied in the storage medium. Any suitable computer-readable storage medium may be utilized, including hard disks, CD-ROM, DVD-ROM, USB mass storage devices, Flash storage devices, optical storage devices, magnetic storage devices, semiconductor storage devices, and/or the like.

The present disclosure is described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general-purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

It will be understood that each functional block of the block diagrams and flowchart illustrations, and combinations of functional blocks in the block diagrams and flowchart illustrations, can be implemented by either special purpose hardware-based computer systems that perform the specified functions or actions, or suitable combinations of special purpose hardware and computer instructions.

With reference to the block diagram of FIG. 1, one exemplary environment in which various embodiments of the present invention could be implemented includes a wide area data communications network 130 such as the Internet. As will be recognized by those having ordinary skill in the art, different server computer systems are connected to the network 130 and provide the contemplated services of the present disclosure. One or more individual computer systems may be aggregated into a primary web server farm 110 comprised of, for example, a first web server 111 and a second web server 112. It is understood that the web servers 111, 112 are conventional computer systems along the lines of those described above, and are embodied with executable instructions that implement the methods of the present invention. In particular, implemented thereon may be a HyperText Transfer Protocol (HTTP) server that accepts requests from client web browser applications, processes those requests, and generates an output based on such requests back to the client web browser application. Some of the data that is output may be retrieved from a database server 116 that is also part of the web server farm 110.

There may be multiple web servers 111, 112 for load balancing and redundancy purposes, so they are shown by way of example only and not of limitation. In accordance with one embodiment, the web server farm 110 includes a single database server 116 but connected to multiple web servers 111, 112, though this is by way of example only. Additional, fewer, or different web servers may be incorporated into the web server farm 110 without departing from the scope of the present disclosure. Considering that the web server farm 110 is comprised of multiple web servers 111, 112 as shown, the addressing of incoming traffic from and outgoing traffic to the wide area network 130 may be handled by a firewall 114, which also serves to block attack attempts and other malicious traffic.

The methods and systems contemplated in accordance with the present invention are understood to require high availability, so one embodiment may incorporate a second, hot failover web server farm 120. Various failover modes are known in the art, though in a "hot" failover as that depicted in the block diagram, the data and execution of each of the web servers 111, 112 and the database server 116 are replicated in the web servers 121, 122, and database server 126, respectively. Such failover may occur in the middle of a transaction, or after gracefully failing the transaction. The file replication 124 from the web servers 111, 112 to the web servers 121, 122 as well as the database replication 128 from the database server 116 to the database server 126, are achieved with various modalities known in the art.

The present disclosure also contemplates the use of a payment processing platform 140, with which a client system may interact. Additionally, the various application services hosted on the web servers 111, 112 are understood to interface with the payment processing platform 140 to complete the requested transactions. According to one embodiment, the payment processing platform 140 (also referred to herein as the processor) is the I2C platform, which may likewise include a web service 141, as well as a reporting service 142, and a transaction processing server 143. Notwithstanding the specific reference to the I2C platform, however, it will be appreciated that any other suitable payment processing platform may be substituted without departing from the present disclosure. The data utilized in the payment processing platform 140 may be stored on a data warehouse 144. Each of the foregoing components of the payment processing platform 140 may be interconnected within a local area network behind a firewall 146, before connecting to the wide area data communications network 130.

Figure 8:
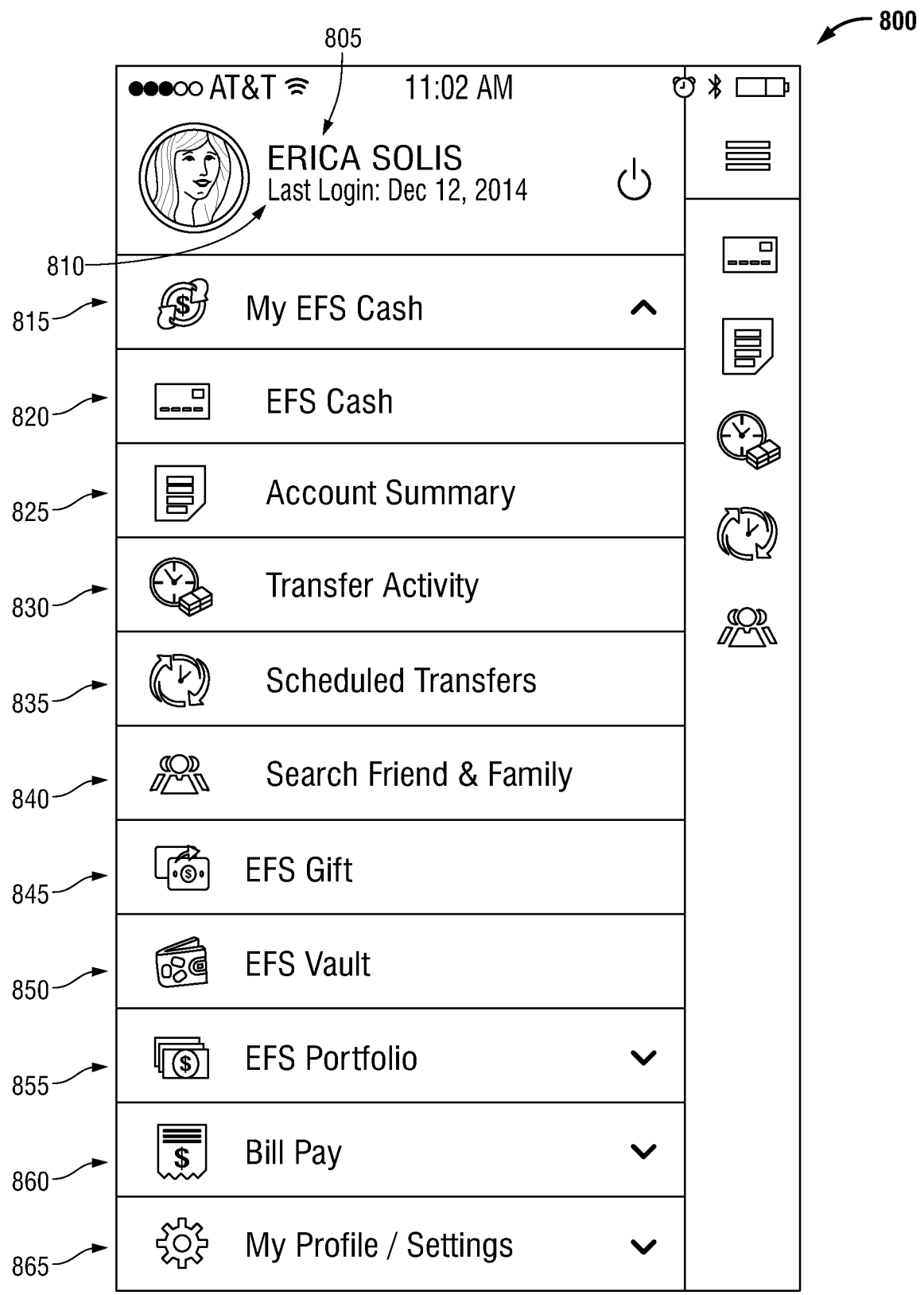
FIG. 8 is an illustration of an exemplary configuration of a graphical user interface for a mobile device application in accordance with an embodiment of the present disclosure.

In accordance with an embodiment of the present disclosure, the financial services ecosystem integrates merchant purchases, mobile devices and plastic with external form factors, and creates tokens for online purchases and peer-to-peer redemptions. In some embodiments, an application, e.g., a mobile device application, is provided to allow users to open and manage accounts with an electronic financial service. The application is configured to allow users to select and fund one or more financial instruments within the financial services ecosystem. The one or more financial instruments may include Electronic Currency, Card-Linked Digital Card, Universal BIN Plastic Digital Card, Cell Repository, Micro-Payments, 3DCash, Hyper Gift Card BIN, and/or Branded Pay Card. An illustration of an exemplary graphical user interface for such an application is shown in FIG. 8, which is described in further detail later in this description. Exemplary interfaces that may be suitable for use with the application are shown in FIGS. 4A-4C, 9 and 10.

Figure 2:
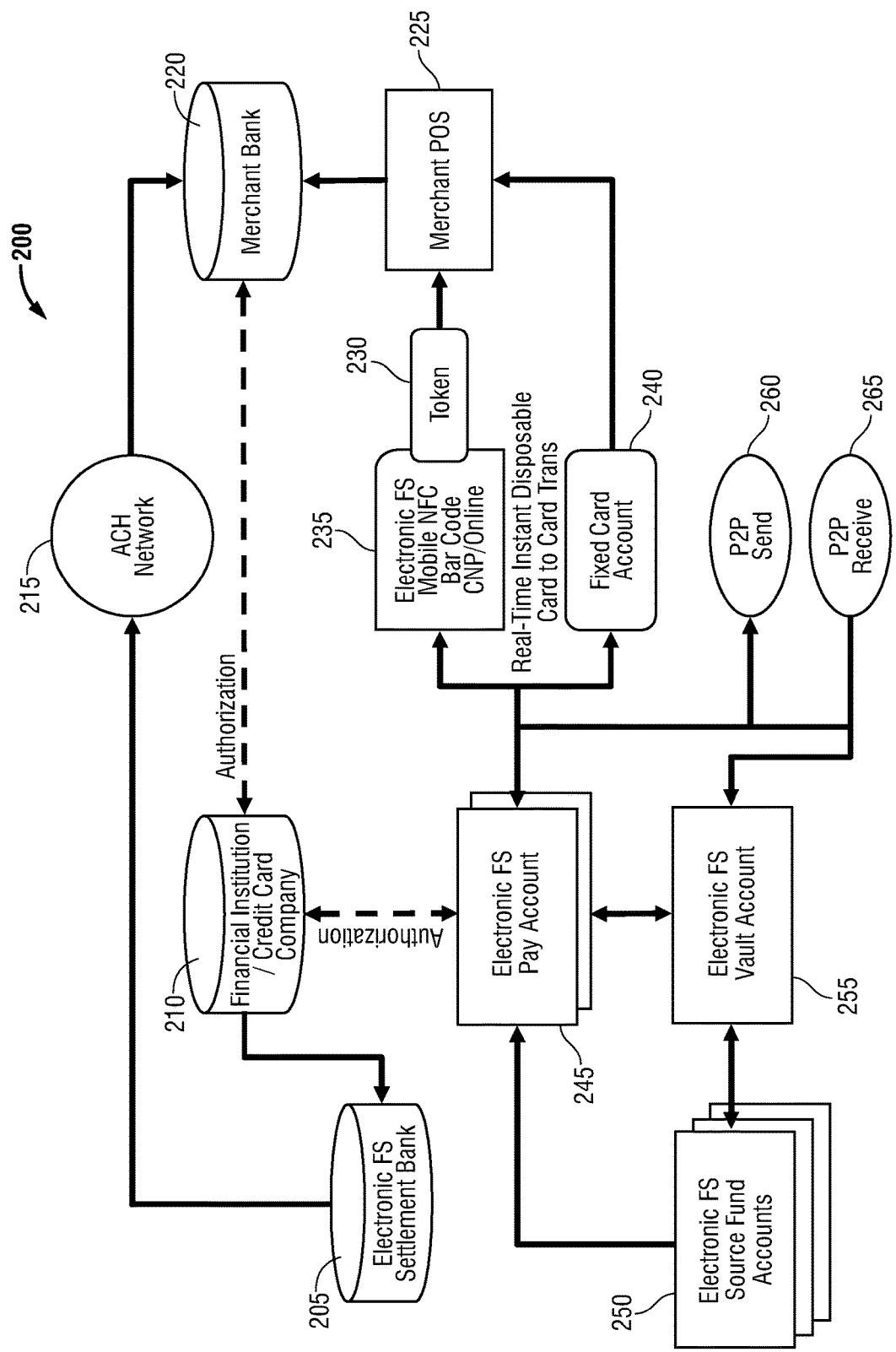
FIG. 2 is a block diagram of a process flow showing a top-level architecture of one embodiment of the present disclosure.

Referring to the flow diagram of FIG. 2, an overview of one embodiment of a financial services ecosystem 200 will be considered. In general, the ecosystem 200 contemplates the crediting of a merchant, by way of a merchant bank 220, for goods sold or services rendered to an end-user/customer. Based upon a conventional payment modality, the merchant bank 220 may be credited via an ACH network 215, based upon a transaction originating from an electronic financial service settlement bank 205. The request to originate such a credit transaction via the ACH network 215 may be generated by a financial institution or credit card processing entity 210.

As an authorization to proceed with the payment, the end user/customer may present a token 230 to a merchant point-of-sale terminal 225. The token 230 may be an electronic financial service code 235, also referred to herein as a HyperBIN, and may be embodied as a near field communications data stream, a barcode, or a card number sequence that is processed in accordance with card-not-present (CNP) procedures. In this embodiment, the token 230 is understood to be processed as a real-time instant virtual, tokenized and disposable card for peer to peer transaction. Alternatively, a fixed card account 240 may be presented to the merchant POS terminal 225. The financial service code 235 and the fixed card account 240 are linked to an electronic financial services payment account 245, which may be queried by the financial institution or credit card processing entity 210 to request authorization to proceed with a credit that involves the electronic financial services payment account 245.

The funds in the electronic financial services payment account 245 may be sourced from an electronic financial service source fund account 250 associated with a particular customer at a financial institution (bank). The funds in the electronic financial services payment account 245 may be replenished from time to time based on user action. Also established within the financial services of the present disclosure is a vault account 255 which may store electronic financial service codes 235 that represent stored values. From the vault account 255, it is also possible to send money, in accordance with peer-to-peer send procedures 260, the details of which will be described in further detail below. Additionally, peer-to-peer received procedures 265 are contemplated, whereby funds may be received from other users. The funds stored in the vault account 255 may be utilized for payment following a conversion to the financial service code 235, or replenishment of the fixed card account 240.

Figure 3:
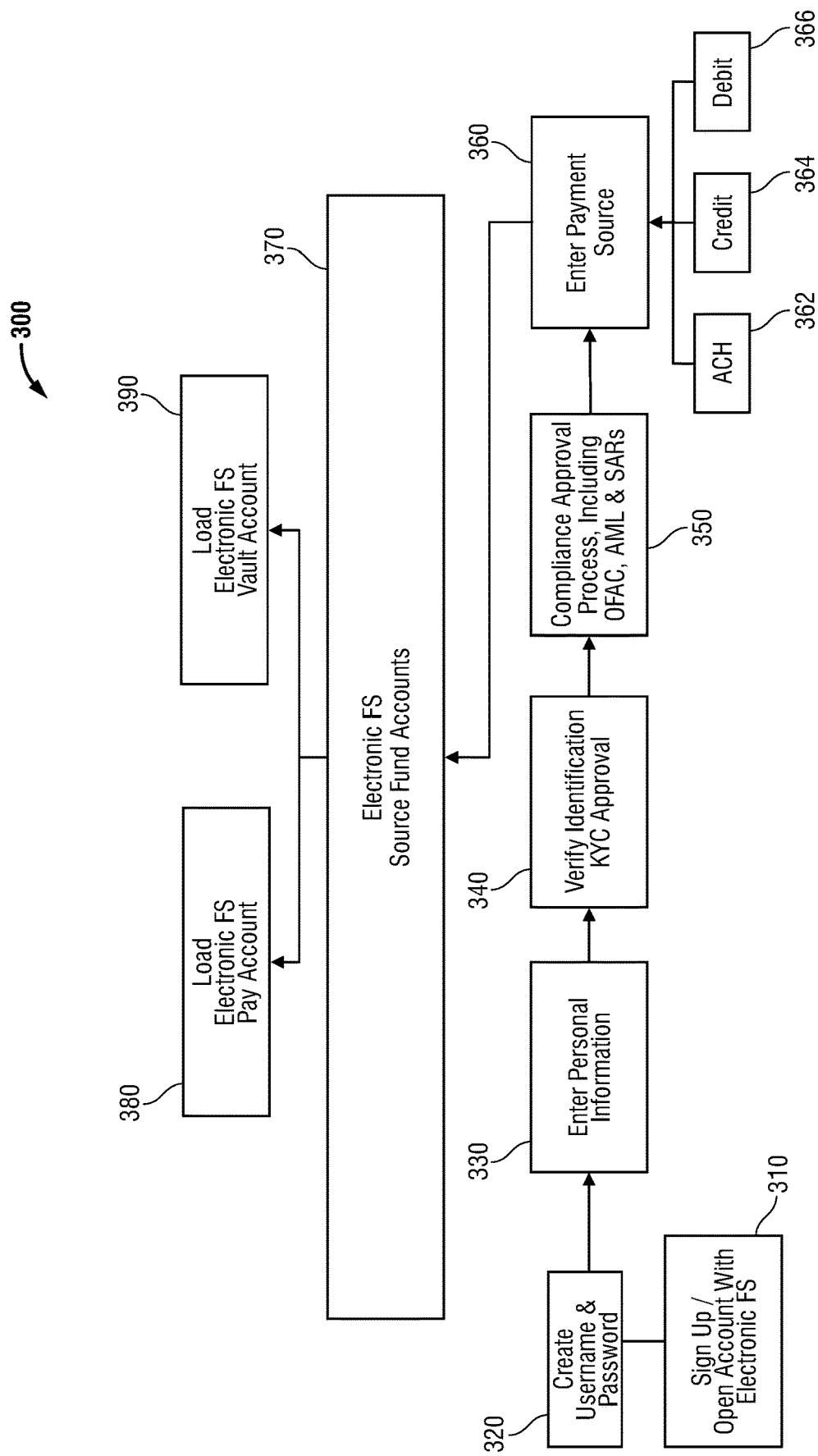
FIG. 3 is a block diagram of a process flow for opening an electronic account and loading funds into the electronic account in accordance with an embodiment of the present disclosure.

The process flow diagram of FIG. 3 illustrates an exemplary procedure by which funds are loaded into the electronic financial services payment account 245 and the vault account 255. To the extent that the user does not already have an existing account, it may be established in accordance with blocks 310-350. More particularly, in a block 310, the customer opens, that is, makes a request to open an account with the electronic financial services system. The customer interaction with the electronic financial system may take place on a portable data communications device such as a smartphone, and if such device is not loaded with the dedicated application software (also referred to as an "app"), the user may be directed to an app store from which the app can be downloaded and installed. The user may request a desired username, and sets a password that restricts access to the account per block 320.

The system requests, and the user may provide, various personally identifying information such as full name, residence address, mailing address, telephone numbers, and so forth. As a preliminary step before submission of the entered data, the user may be presented with a consolidated view of the same, and requested to confirm following a review. If revisions need to be made, then the user interface may regenerate and repopulate the form fields for further editing. Once the user confirms the submission, a welcome message may be generated. Depending on the particulars of the device from which the account is set up, it may be possible to enable alerts that are generated upon the occurrence of certain events, and in the setup procedure, permission for the app to generate such alerts may be set.

As part of the account initiation process, the user may also be requested to specify a type of account. According to one embodiment of the present disclosure, the two types of accounts are the electronic financial service payment account 245 and the vault account 255. Various instructional pages may be presented to the user explaining the differences between the types of accounts. Because there are certain limitations in the user's rights and the permitted scope of use is subject to certain restrictions established by the electronic financial service, various account agreements, terms, and conditions, as well as a privacy policy, among other legal documents, may be presented to the user. The user can then be prompted to reject (which terminates the account initiation process) or accept all of the terms. The electronic financial service payment account 245 and the vault account 255 are then established, and a consumer account enrollment package and benefits may be fulfilled.

In a block 340, the identity of the requesting user is verified in accordance with Know Your Customer (KYC) regulations. A further validation step takes place in block 350, including approvals for compliance with Office of Foreign Assets Control (OFAC) regulations, Anti-Money Laundering (AML) regulations, and Suspicious Activity Reports (SARs) with the Financial Crimes Enforcement Network (FinCEN). It is possible for a third party processor service (such as the aforementioned I2C) to perform these verification steps, and in such case, the third party service may indicate either a pass or a fail that is then interpreted by the electronic financial service. When this part of the account formation fails, a notification to that effect may be transmitted to the user. In conjunction with establishing the various accounts on the electronic payment service, a physical card encoded and/or imprinted with account numbers may be produced and dispatched to the user as specified in the provided address information.

As will be described in further detail below, another aspect of the present disclosure involves incorporating social media and user contacts into the various payment processing procedures. Rather than signing in via the electronic financial service system, the user may sign in with an existing social media account. Those having ordinary skill in the art will recognize the modalities by which this may be achieved, and so the details thereof have been omitted. In some embodiments, the sign-in procedure may also involve a multiple factor authentication, where a nonce is transmitted to via e-mail or Short Message Service (SMS) text message on a mobile device, with that nonce being requested at the time of access to the electronic financial service system. Alternatively, a phone number verification procedure may also be utilized.

When the social networking features of the present disclosure are being utilized, established contacts on such separate social networking sites may be imported into the financial service system, that is, those accounts to which the user has a "friend" or other relationship on the social networking site may also become a related contact on the financial service system, to the extent such other user also has an established account. When a contact on the social network site does not have a corresponding account on the financial service system, an option may be provided for the user to authorize a message being sent to invite such contact to join. The contacts from the external social network site may be updated or synchronized on a periodic basis. By signing into the electronic financial system with a social networking account, it is possible to import account data such as profile pictures, birthdays, and other personal information as well. The sharing of contacts and personal information may be on a selective basis according to the preferences of the user.

According to various embodiments of the present disclosure, the electronic financial services payment account 245 and the vault account 255 may be funded from different sources. For instance, the funding source may be a checking or savings account from which money may be transferred via the ACH network 362, as well as a credit card account 364, and a debit account 366. The particulars thereof, including account numbers, routing numbers, and the like as pertinent to the funding source may be provided by the user, in block 360. The selection(s) and provided information for the funding sources may be stored in the electronic financial service source fund accounts according to a block 370, and a requested amount of money may be loaded into either the electronic financial service payment account per block 380, or the electronic financial service vault account per block 390.

With reference to the screen captures of FIGS. 4A-4C, one exemplary interface with which the foregoing steps of transferring funds to the electronic financial services payment account 245 is shown. Although the screen captures depict a web-based interface that is accessed with a conventional web browser application, it will be appreciated by those having ordinary skill in the art that any other suitable interface such as the aforementioned dedicated app may be substituted. In further detail, FIG. 4A is an interface in which an ACH transfer may be set up, and accordingly includes a first input field 410*a* in which the bank account number may be specified. The bank account (e.g., the savings account or the checking account) has an account owner associated therewith, and the full legal name thereof may be specified in a second input field 410*b*. In an account selection/third input field 410*c*, the type of account, that is, either a checking account or a saving account, may be specified. The name of the financial institution/bank with which the account is associated, is specified in a fourth input field 410*d*, and the routing number corresponding to that financial institution/bank may be input into a fifth input field 410*e*. It is possible for the user to save multiple financial institutions and identifying information therefor, and such saved data may be recalled via a first pull down menu 412.

In a conventional ACH transfer, there is understood to be a delay, but according to some other embodiments, it is possible to immediately transfer funds from an omnibus account owned by the provider of the electronic financial service for an extra nominal fee. Prior to the electronic financial service undertaking the risk of the customer potentially not having the funds to cover the payment, a preliminary credit check may be instituted. Otherwise, the funds transfer process proceeds as discussed above for standard ACH transfers.

The exemplary interface shown in FIG. 4B may show all of the funding source accounts that are saved in connection with the electronic financial services payment account 245. The basic information for each funding source are shown in a tabular formal, with a first column 430*a* showing a user-designated account nickname, a second column 430*b* showing the last four digits of the account number, a third column 430*c* showing the account type, a fourth column 430*d* showing the routing number for the financial institution, a fifth column 430*e* including an icon designating whether the account is funding source, a payment destination, and so forth, a sixth column 430*f* showing the status of the account (whether it has been validated as belonging to the accountholder), as well as a seventh column 430*g* showing additional user-input remarks concerning the account. In an eighth column 430*h*, there are hyperlinks that may be selected by the user to edit and delete the account.

As indicated above, it is also possible to add a credit card as a funding source, and the exemplary interface shown in FIG. 4C may be utilized to such ends. Again, there is a first input field 450*a* in which the card number may be input, along with the expiration date that is specified via a first month pull-down menu 452*a* and a second year pull-down menu 452*b*. Additionally, a credit card security code, usually a 3- or 4-digit number, may be entered in a second input field 450*b*. The destination electronic financial services payment account 245 may be specified via a third pull-down menu 452*c*. The total amount to be transferred into the designated electronic financial services payment account 245 is input into a third input field 450*c*. Because the credit card is assumed to be owned by the same account holder as the electronic financial services payment account, the personally identifying information associated therewith is the same. Accordingly, the information is merely displayed in a display area 454. Further remarks about the credit card account may be specified in a comment input field 450*d*.

The foregoing transfer may be treated along the lines of a purchase of funds, and accordingly, prior to displaying the interface described herein, there may be a shopping cart functionality that allows the user to add such purchases prior to "checking out." It is possible to purchase funds that are represented in the aforementioned tokens 230 without establishing an electronic financial services payment account 245. After completing the purchase transaction, a verification of the purchase of the token 230 may be transmitted to an e-mail account or as an SMS text message to a designated telephone number. Thereafter, the mobile application may provide the user with an indication of a stored value corresponding to the transferred/purchased amount.

Various embodiments of the present disclosure contemplate a single user having multiple electronic financial services payment accounts 245, and referring again to FIG. 4A, the destination account to which the funds will be transferred may be specified via a second pull down menu 414. The total amount of the funds to be transferred is input into a sixth input field 410*f*. The funds may be transferred into the specified electronic financial services payment account 245 on a one-time basis, or on a set schedule, and so forth, and may be selected via a third pull down menu 416. Additional comments regarding the account and transfer may be input into a comments/seventh input field 410*g*.

HyperBIN

HyperBIN addresses and solves the current bill pay systems inability to pay a biller in real time with notification and ability to scale a network without going through the task of creating strategic relationships. The issue is twofold: 1) how to make money move faster by creating a synthetic settlement process; and 2) how to create notification to the unique biller. For example, if a customer pays his or her bill using an online bill payment service and uses a checking account on file with the online bill payment service, the funds will be sent via ACH through a standard process which can take three or four business days to complete. One problem is the scenario where a payee could be subject to a late fee or other penalty if payment is not received by a particular date. For example, a utility could be turned off or a late fee on an auto or credit card payment could be assessed.

Ideally, both payment and notification are received by the biller on the day that the payment is made. Some companies have been creating strategic relationships with individual billers whereby they have direct communication with the biller via an API. While this approach works, it is highly limiting and the relationship sales cycle can be months and even years. Considering the millions of potential billers, this is not a scalable solution for the industry to be ubiquitous.

In an exemplary scenario, a customer establishes an account with an aggregator and loads their debit cards and checking accounts. This results in the payee providing all of their financial information in order for the aggregator to receive the routing numbers, account numbers, and card numbers on debit and credit cards. Where debit cards and credit cards are being used, the biller is notified of the payment and the funding processes through the normal settlement channels using the credit card standards. HyperBIN transfers electronic funds transfer (EFT), e.g., eCheck payments, over the ACH network, which is the preferred form of payment by billers because of the lower cost (e.g., 80% less) to process. Therefore it is the goal of the aggregator to drive as much business through ACH and an electronic funds transfer EFT as possible.

The HyperBIN solution in accordance with an embodiment of the present disclosure involves the process flow described below. The customer selects the payment that he or she wants to make to the biller using his or her checking account. That checking account is verified for funds by the electronic financial service, because the electronic financial service receives all the data and balances. When the consumer selects the account he or she wants to use, the aggregator is creating a strategic relationship with individual billers that will make sure, in real time, that the account balances are sufficient to cover the amount of the payment. Once the balance is verified, the electronic financial service allows the consumer to use a HyperBIN to expedite payment using a checking account identified by the consumer. The electronic financial service then uses the HyperBIN that runs on the existing payments infrastructure of Visa and MasterCard like a gift card that is virtual, tokenized and disposable. However, the HyperBIN is not tied to the consumer but is tied the aggregator as both the issuer and the acquirer of the BIN and merchant settlement account.

The aggregator pays the biller for the benefit of the consumer's account so that the biller knows it is paid and the money is guaranteed to be delivered and the notification can be attributed to the payee's account. The bank is consolidating the settlement transactions under the same bank so it becomes a record-keeping item. In some embodiments, there is an omnibus account with an amount of money that is there to guarantee the authorization of the transaction. HyperBIN is an authorization BIN that is provided to the biller so that the biller can document that the consumer has paid the bill.

A guarantee may be placed for payment as the electronic financial service collateralized the payment with the obligation against the receipt of the money that is coming from the consumer's bank account using standard ACH procedures.

In this scenario, the consumer is paying the balance to the aggregator rather than directly to the biller and the HyperBIN is a conduit payment solution for the Payee. HyperBIN collateralizes its liability with ACH instructions from the consumer's bank. The agreement template will allow the aggregator to settle the HyperBIN transaction against any billing information available to it. In this sense, it is an auto-collections process. In a normal settlement, the money received from ACH is cleared against the HyperBIN transaction that came through the ACH rails. The ACH will route through the electronic financial services bank as the originating depository financial institution (ODFI) and the risk to the receiving depository financial institution (RDFI) is zero.

In some embodiments, the cost of each card number issued by the HyperBIN may be about $0.20, or less, and the cost to run that ACH may be approximately $0.10 per transaction. In this scenario, the HyperBIN acts like a gift card will settle against the omnibus account or settlement account that the electronic financial service has at its ODFI. A range of virtual card numbers will be issued to the electronic financial service, e.g., auto-generated as a HyperBIN transaction is initiated. An open file will be created that will match outstanding HyperBINs (e.g., downloaded nightly or in real time) to be reconciled with incoming ACH transactions coming from the consumer's bank account. The ACH will then cross reference those to the open files at the bank, match them up, and close amounts as completed. If an ACH transaction from the consumer's bank is rejected the electronic financial service will enter a collections process.

Electronic Currency

In some embodiments, HyperBIN is used for electronic exchange. When money is sent to a recipient using HyperBIN, Electronic Currency is created and embedded onto a bar code, magnetic strip, or QR code in the form of a virtual, tokenized and disposable card BIN that can be recognized by any POS device. As will be described in further detail below, the card BIN need not be disposable in some embodiments. The virtual, tokenized, and/or disposable card may also be more generally referenced as a card BIN. Electronic Currency guards the consumer's portfolio of linked bank accounts and card information through a unique tokenization process. HyperBIN allows one time use of an exact amount of Electronic Currency with no card data transferred.

HyperBIN and Electronic Currency are issued through a bank, running on the existing payments infrastructure of Visa and MasterCard with the American National Standards Institute (ANSI) standards approved for bank identification numbers (BINs). The Electronic Currency converts the utility of a virtual, tokenized and disposable card BIN issued by Visa or MasterCard into electronic currency. This gives Electronic Currency redemption capabilities in the peer-to-peer spaces that does not exist today both online and offline, and may achieve widespread acceptance. HyperBIN and Electronic Currency collectively form a new electronic currency using the existing tracking functionality of BIN's, ANSI standards and credit card rails.

In another exemplary scenario, a consumer walks into a coffee shop and pays with Electronic Currency. The cashier at the coffee shop runs the Electronic Currency just like any other Visa/MasterCard gift card, except that the redemption is "open loop," meaning that Electronic Currency can be passed from one end user to the next, until redeemed for goods, services or cash. In some embodiments, Electronic Currency may be sent via email with tracking capabilities. HyperBIN is the identification that is tracked for reconciliation while the consumer remains anonymous.

The benefit to merchants from this redemption model is that it drives traffic into their store, and the benefit to the consumer is that he or she can easily send and receive money and convert it into cash or use it to buy products, online or offline, anywhere. This electronic currency and cash conversion capability may provide the catalyst for hyperlinking payments, mobile wallets, electronic coupons and gift redemption directly into mainstream finance.

For virtual and fiat currency (e.g., Bitcoin Exchange), an Automated Repository Key is created for identification and trading. The electronic financial service handles all of the anti-money laundering (AML) compliance, Patriot Act compliance, and customer identification (as part of Bank Secrecy Act) compliance. When a trader opens an account at an exchange they need only give their "trading ID number" to the exchange. The financial services entity verifies all information using existing services. When a trader establishes an account, the financial services entity verifies that the account is registered and the PIN matches. This protects the anonymity of the trader.

Figure 5:
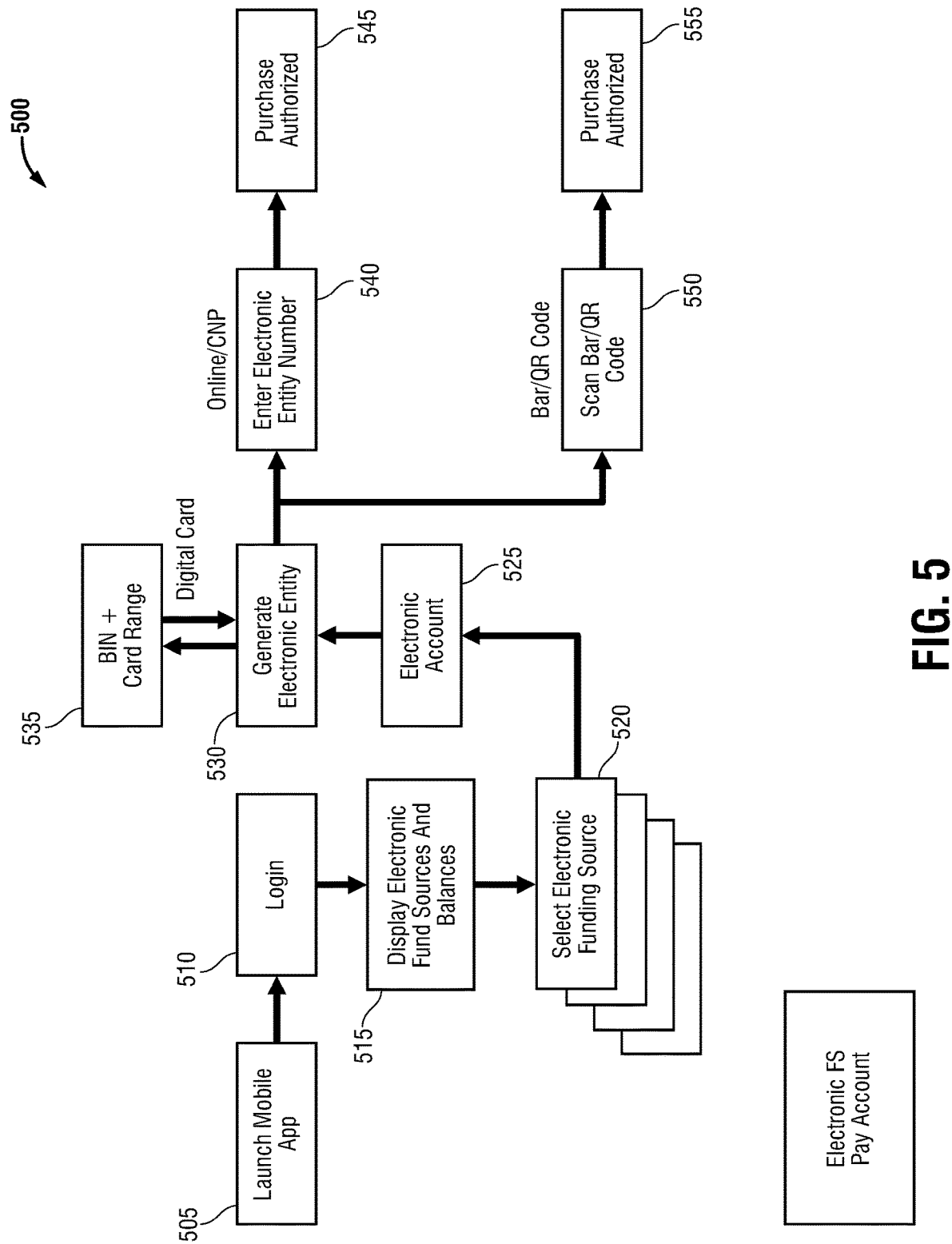
FIG. 5 is a block diagram of a process flow for authorizing a purchase from an electronic account using a mobile device application in accordance with an embodiment of the present disclosure.

With reference to the block diagram of FIG. 5, an exemplary process flow for authorizing a purchase from an electronic account using a mobile device application is shown. In block 505, the consumer launches the electronic financial services mobile app. In block 510, the consumer logs into the mobile app.

In block 515, a processor dashboard displays electronic fund sources and balances. In block 520, the consumer selects an electronic fund source from multiple funding sources. The processor transfers funds to the electronic account selected by the consumer, in block 525.

Instructions are given by the consumer to generate an electronic entity, in block 530. In block 535, a digital card number is pulled from the BIN range by the processor.

In one exemplary scenario, where the consumer orders a product from a payment gateway-enabled merchant, the consumer enters the digital card number into the gateway, in block 540. The gateway will allow and make the connection if the consumer is authorized to access the gateway. In one scenario, the bank authorizes the purchase, in block 545. Alternatively, the purchase may be declined. In the case where the purchase is authorized, the processor completes the transaction.

In another scenario, after the digital card number is pulled from the BIN range by the processor, in block 550, the mobile device application generates a QR code image, in block 550. The consumer uses the QR code image to make a purchase, in block 555.

Card-Linked Digital Card

In some embodiments, wherein an online catalog of participating vendors has been created, the consumer may click on the vendor at which he or she wants to make a purchase. Using the electronic financial services mobile app, a Card-Linked Digital Card is loaded with cash value in accordance with the consumer's wishes. The Card-Linked Digital Card may be sent via email or text to the recipient, and a QR code in the form of a virtual, tokenized and disposable card BIN may be utilized.

In some embodiments, a Card-Linked Digital Card may be given with every Electronic Currency that can be reloaded via the HyperBIN process flow described above. In this way, the consumer can use the Card-Linked Digital Card account anytime using the existing credit card rails. No new equipment is needed.

Because the Card-Linked Digital Card is electronic currency, not a debit card, no Social Security number is required, and no bank account information is required. The consumer may use a Visa, MasterCard, or Discover BIN, by sending HyperBIN as authorization to load in real time and the electronic financial service approves the transaction at the merchant bank.

When a Card-Linked Digital Card is redeemed the funds will be credited to the merchant's settlement account through the merchant bank just like a credit card processing transaction.

Universal BIN Plastic Digital Card

A Universal BIN Plastic Digital Card can access multiple payment options. A key is created in the mobile registry on a scale of 1 to 10, for example. Each Universal BIN Plastic Digital Card is confirmed that it belongs to the owner through fingerprint and authorization codes.

In some embodiments, an image of both sides of the card is captured and held in a database creating a card present transaction. When the consumer selects the card to be used, using his or her cell phone or tablet, the picture of the card is presented. When the phone or tablet is swiped against the Universal BIN Plastic Digital Card, a chip within the phone or tablet reads the card and the ID loaded into the card. The magnetic strip on the Universal BIN Plastic Digital Card is then encoded with the appropriate consumer's BIN number with an extra digit to identify the payment selection in accordance with the key created.

When a consumer opens the electronic financial services mobile app, all of the cards loaded will be presented. The consumer taps on the screen to select the icon of the card he or she wants to use, and can "bump" the phone or tablet against the card chip and the data selection is transferred to the chip on the card. Then the card populates the data onto the magnetic strip. This selection of payment remains as the resident payment until a new selection is loaded in the same manner.

The issuing bank receives the transmission and forwards the payment instruction on to the appropriate payments processor. A cash payment can also occur by selecting "cash" and swiping the card using Electronic Currency. Cash can be loaded onto a plastic card as well onto a Universal BIN Plastic Digital Card. The advantage to the merchant is immediate cash credit against credit card receivables at full value using HyperBIN. In some embodiments, omnibus accounts at major banks will allow ubiquitous loading of cards using HyperBIN.

A consumer can use the Universal BIN Plastic Digital Card by tapping on the icon option on their phone and swiping it against their card, after which the consumer can use the Universal BIN Plastic Digital Card in a manner similar to a credit card. In some embodiments, the Electronic Currency will be held in multiple omnibus accounts with FDIC insurance. Universal BIN Plastic Digital Card transactions are closed loop transactions, meaning in this context that the communication is transmitted directly to the issuing bank responsible for payment to the merchant. Settlement to merchant accounts for Universal BIN Plastic Digital Card transactions is handled according to the HyperBIN process flow described above.

Figure 6:
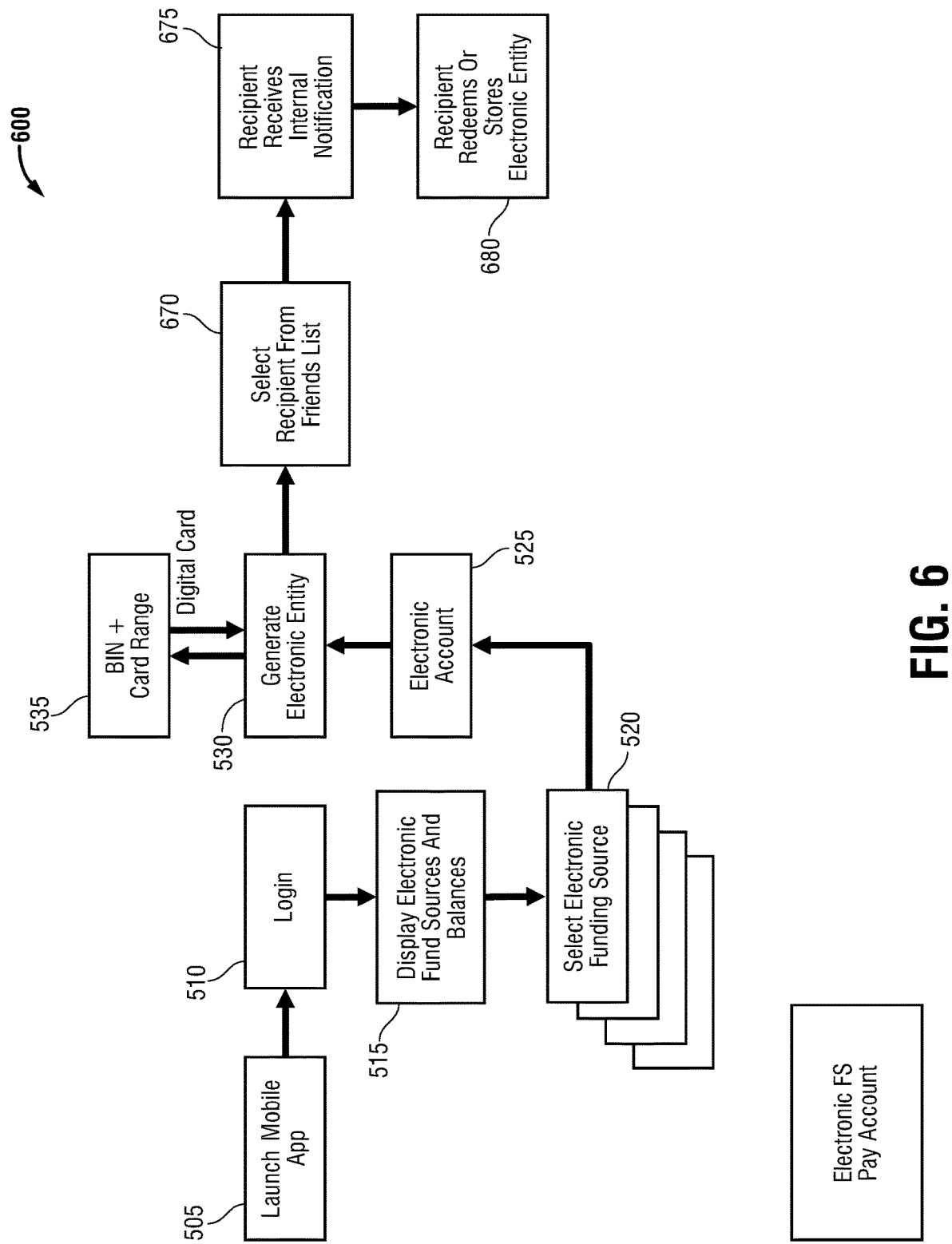
FIG. 6 is a block diagram of a process flow for authorizing an electronic currency payment or gift using a mobile device application in accordance with an embodiment of the present disclosure.

With reference to the block diagram of FIG. 6, an exemplary process flow for authorizing an electronic currency payment or gift using a mobile device application is shown.

In block 505, the consumer launches the electronic financial services mobile app. In block 510, the consumer logs into the mobile app.

In block 515, the processor dashboard displays electronic fund sources and balances. If no funds are available (or if the consumer wishes to make sure adequate funds are available), then the consumer selects an electronic fund source from multiple funding sources, in block 520. The processor transfers funds to the electronic account selected by the consumer, in block 525.

Instructions are given by the consumer to generate an electronic entity, in block 530. In block 535, a digital card number is pulled from the BIN range by the processor.

In one exemplary scenario, where the consumer selects a recipient from a Facebook friend's list, in block 670, the recipient receives text message with a hyperlink. When the new user clicks on the hyperlink, a popup box displays a message that the electronic financial service would like to send notifications. If the recipient approves the receipt of notifications, the processor sends a message that "set-up is now complete." In block 680, the recipient (new user) redeems or stores the electronic currency gift.

Figure 7:
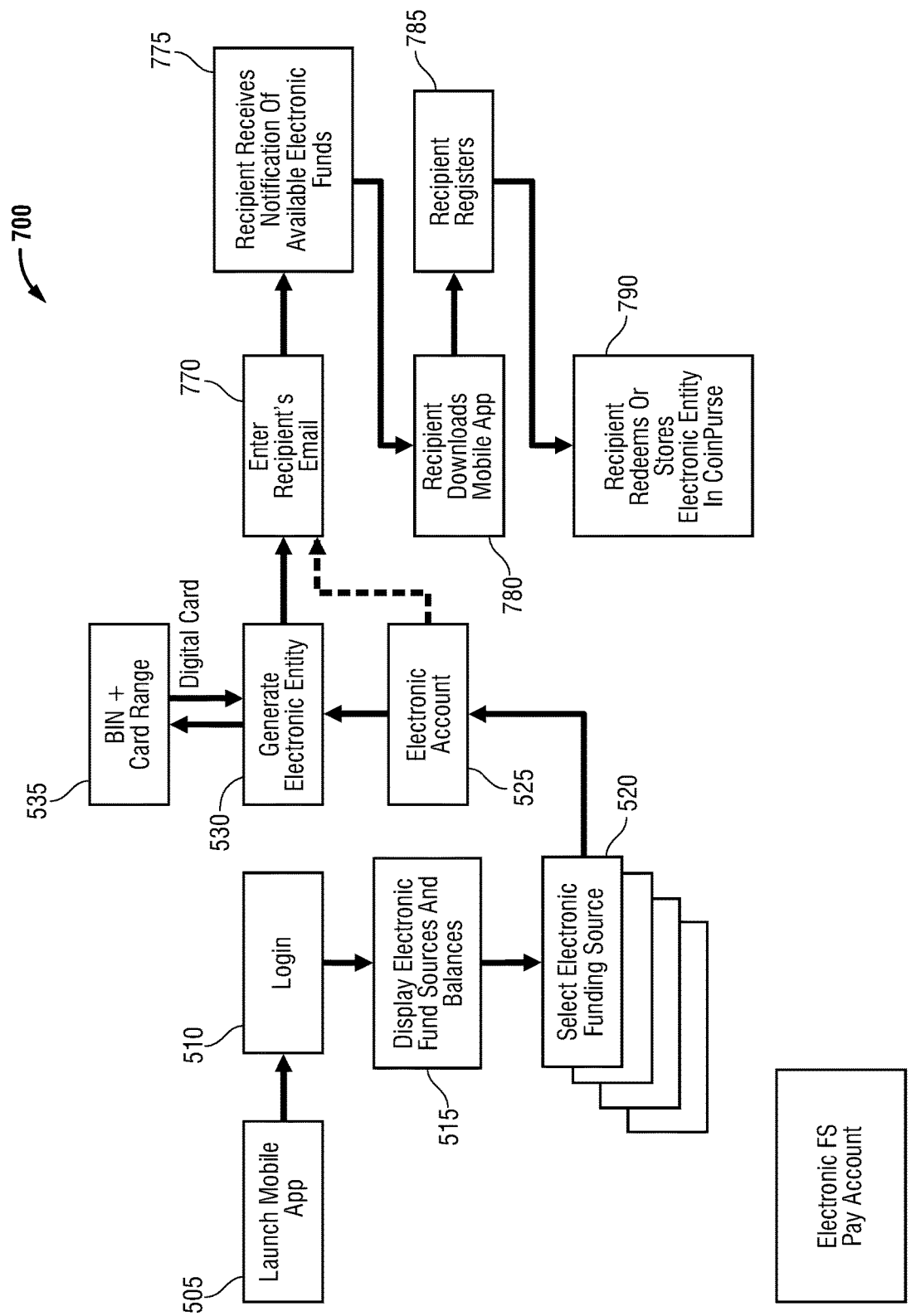
FIG. 7 is a block diagram of a process flow for redeeming an electronic currency gift using a mobile device application using a mobile device application in accordance with an embodiment of the present disclosure.

With reference to the block diagram of FIG. 7, an exemplary process flow for redeeming an electronic currency gift using an electronic financial service mobile app is shown. The consumer can accomplish launching the mobile app, logging in, and selecting an electronic fund source, as described above with reference to FIG. 6. Instructions are given by the consumer to generate an electronic entity, in block 530. In block 535, a digital card number is pulled from the BIN range by the processor.

The consumer enters the recipient's email, in block 770. The recipient receives notification of available electronic funds and instructions to download the electronic financial services mobile app, in block 775. The recipient downloads the electronic financial services mobile app, in block 780, and registers for an account with the electronic financial service, in block 785.

The screen capture of FIG. 9 illustrates an embodiment of an exemplary user interface that may be used to initiate transfers between users of the electronic financial service, particularly those users which have been designated as friends or family, or otherwise indicated as having a close relationship to such an extent that money transfers occur on a regular basis. In a first pull-down menu 910*a*, the account from which to transfer funds is selected. Similarly, in a second pull-down menu 910*b*, the account to which the funds are transferred is selected. The amount is specified in a first input field 912*a*. As indicated above for incoming fund transfers, a schedule for the transfers may be setup, and is designated (one time, weekly, monthly, and so on) via a third pull-down menu 910*c*. Further remarks concerning the transfer may be input into a fourth input field 910*d*. Once the requisite information is provided, the transfer may be initiated by activating a send button 914*a*. Otherwise, the information regarding the transfer may be cleared from the user interface in its entirety by activating a clear button 914*b*.

The screen capture of FIG. 10 illustrates one embodiment of a user interface utilized in gathering information for transferring funds in the electronic financial service account 245 and/or the vault account 255 to an external bank account, e.g., the electronic financial service source fund account 250. The particular account from which to transfer the funds is specified in a first pull-down menu 1010*a*, within which there are one or more of the electronic financial service account 245 and the vault account 255 belonging to the user being identified. The transfer is understood to take place by conventional ACH modalities, and accordingly, destination account number is specified in a first input field 1012a. Alternatively, a pre-stored destination account may be selected via a second pull-down menu 1010b, the selection of an entry therein resulting in the account number, legal owner name, account type, bank name, and routing number values being automatically populated in response. Along these lines, in a second input field 1012b, the legal owner name is specified, in a third input field 1012c, the bank account type (checking or savings) is specified, in a fourth input field 1012d, the bank name is specified, and in a fifth input field 1012e, the bank routing number is specified. The total amount to transfer is input into a sixth input field 1012f. Again, as indicated above for incoming fund transfers, it is also possible to designate a schedule for outgoing fund transfers. In this regard, via the third pull-down menu 1010c, it is possible to selected a transfer frequency/schedule. Further remarks concerning the transfer may be input into a seventh input field 1012 g.

Cell Repository

Using a cell phone, the consumer instructs the carrier or service provider to transfer money to the Cell Currency Account. Using top up technology the money is loaded onto PSS instead of to cell minutes.

The consumer can buy prepaid minutes that can be spent as cash through the Cell Repository. Refundable minutes can be converted for cash. HyperBIN works as a loading function. The balance of minutes can be redeemed for purchases using their Universal BIN Plastic Digital Card app, as described above.

The Cell Repository is also a card issuer but not a merchant service provider. The consumer can use the card anywhere Visa and MasterCard is accepted through the gateway. The telephone number becomes their HyperBIN BIN. The electronic financial service loads all earner telephone numbers into the system as HyperBIN BINs and a PIN is created and assigned for electronic signature purposes.

When the consumer swipes or scans their Electronic Currency, Card-Linked Digital Card, Universal BIN Plastic Digital Card, or Cell Repository loaded with HyperBIN, payment is made and approved and settled by the gateway.

In scenarios where a user walks into a merchant where a payment will be made using mapping and cell phone number and carrier service, the user must turn on their GPS locator on their phone. The user's phone may have iOS 5s fingerprint technology to confirm the identification of the phone owner.

In one exemplary scenario, the mobile wallet is not registered to transmit the card number over the existing credit card rails, but rather the BIN numbers are tied to the cell phone number housed in a cloud environment at the cell carrier. This new cellular point of sale "CPOS" transmits the transaction details using nothing more than the cell phone service. Once the carrier receives the data, it matches the cell number to the record keeping file where all of the payment information is securely stored. The authentication occurred at the hand set level using finger print technology and does not require new POS terminals. One transmittal option would be a "Plug in" device such that an iPad could be retrofitted to the existing terminal with a cell connection to feed the data to the credit card terminal. Another option would be for a direct line from the cell carrier to the processor (First Data) and gateways where the authorization would be routed through the normal channels and back to the terminal for authorization.

No NFC or MVC technology is needed, and this technology process can migrate with new hardware. CPOS is a backend cloud-based process which relies on hardware authentication, not local transmittal of data which is too hard to predict since the front-end user experience changes too fast and requires a huge upfront investment. Most of the backend technology is already in place and IOS has already launched fingerprinting for 5s. The coding required to link the backend may be relatively light.

The cellular phone is a self-governing device, which can be located using existing mapping technology. A text password protected text message could be sent to further verify the authentication of the user.

Cellular phone credits using either Electronic Currency, Card-Linked Digital Card, 4, or Cell Repository can be used as auto pay connected to walk through security systems with cellular capacity to verify credit 111 a passbook which ties all of the passbook enabled PS BINs in the cell phone number to flow through PS rails.

Micro-Payments

Micro-Payments System is where concerned citizens of the world unite to support the poorest in our world. Discounts, rebates and rewards are converted to Electronic Currency and are credited to the recipients account through cellular means in PSS. The account would be established with a bank partner(s) using a Card-Linked Digital Card and would be FDIC insured or equivalent. The structure would be a HyperBIN custodial account program for each country where an omnibus account arrangement would be architected to hold all value in safe keeping for the individual participants.

Individuals could select a child or family to point their Electronic Currency towards for deposit as benefactors through a matching technology based on a sort of crowd funding search criteria.

Once a benefactor is selected, all future contribution from the Donor is directed to the account of the selected benefactor.

Once the benefactor has Electronic Currency in his or her account, the balance in Electronic Currency can be used for market exchange to buy and sell goods and services. For example, a sheep herder buys a head of sheep using Electronic Currency and the seller buys bread using Electronic Currency from a local baker and so on. Electronic Currency is transferred by cellular service. Cell Repository uses a secure and protected backend technology.

Loans could also be loaded and loaned remotely to the carrier device based on projected and trajectory of contribution by donors. For example: the aggregate spending of 10 donors is 1000 a month, generating a $25 donation to the benefactor. A loan for $100 worth of Electronic Currency could be deposited on behalf of the benefactor paid off with future donations over 6 months including an interest rate of x % in this example.

3DCashPrinter

3DCashPrinter is digital currency that works using the 3dPayments infrastructure and settlement procedures as described in patent application filing 62/919,350. 3dCashPrinter uses virtual, tokenized and disposable digital cards that can be issued and printed directly from your home printer in the creation of paper currency that can be used for everyday purchases at merchants around the world. 3dCashPrinter can be customized with your own picture and color scheme within a predefined tokenized template. A range of digital numbers is loaded into each system as an OEM installation using hyper secure firewall technology. 3dCashPrinter uses a secure wireless system to transmit and receive an authorization code to issue and print the exact amount of 3dCashPrinter capturing the value of such issuance and retransmitted directly back to the financial institution for account reconciliation. This is akin to a debit card transaction, processed through a 3dPayments Printer. This digital currency will have unique numbers and tokens e.g., Hyper-Bin in digital currency, which are embedded on a magnetic strip, QR code or bar code for swiping, reading, or scanning depending on the equipment available at the merchant's point of sale (POS) as a redemption system for USD, Bitcoin or any other form of stored economic value.

In some embodiments, 3dCash may be issued in $1, $5, $10, $20, $50 and $100 increments. Where used and approved via an authorization code like a Visa or MasterCard transaction, change in USD can be given to the holder of 3dCash for the difference.

The goal is to eliminate ATM fraud and to move the ATM, figuratively speaking, inside of the home of the consumer. The consumer also has ability to cancel 3dCash if it is lost or stolen. 3dCashPrinter can cut down on illegal activity because it is tracked easier. In some embodiments, the backend works in exact tandem with HyperBIN. The consumer's 3dCashPrinter may be transformed into a mint for printing customized currency in the exact values the consumer has indicated. The consumer may remote deposit and then print out the currency.

In some embodiments, use of 3dCash requires no additional hardware, and merchants need not join a new network. The card numbers may be virtual, tokenized and disposable card MasterCard or Visa BINs and may be acceptable wherever MasterCard and Visa are accepted.

Functionally, the balance due after payment would be similar to a "cash back" withdrawal after a debit card transaction. If the consumer does not use their issued 3dCash, it can be redeposited into an account using remote deposit.

3dCash replaces check writing and has two points of authorization. First, when the currency is authorized for issuance, the amount must be approved by the bank. Second, when it is redeemed, the HyperBIN must approve and authorized at the Point of Sale (POS) using standard POS readers and devices. 3dCashPrinter generates a cross between a check, cash and a credit card. 3dCash has all of the benefits of cash, all the security of a credit card, and the functionality of a preprinted check.

Hyper Gift Card BIN

Hyper Gift Card BIN is a self-initiated gift card technology that auto generates directly from the consumer's iPhone, iPad, or any other electronic device or computer. Hyper Gift Card BIN is merchant agnostic (any retailer should be able to adopt the technology without any infrastructure upgrades, using existing merchant account bank relationships). One enters a user name and password directly from their device and uses the HyperBIN business process, banking structure and invention disclosure described in U.S. Provisional Application Ser. No. 62/919,350. Through the real-time issuance of a Hyper Gift Card BIN, a consumer can generate a token with cash loaded right from their mobile device through a repository function where account numbers and credit and debit card numbers are stored and secure. The consumer can select and choose an account for loading and the system places an initiation charge for the instructed amount and uses its financial platform for immediate loading of value on a Hyper Gift Card BIN that is converted to digital token for immediate use. The mechanism which the token is loaded on for redemption can be a smart chip, which can be swiped at a standard POS or through a printer that is set up to receive the token and which is designed to print codes which can be read by standard POS systems or any other form of delivery mechanism which can be used as a transfer agent for the electronic currency. The Hyper Gift Card BINs are virtual, tokenized and disposable card and may help eliminate fraud; for example, hackers would be stealing a waste basket of useless BINs if they are able to breach a merchant's database. The Hyper Gift Card BIN can be used to pay bills, used in person-to-person payments and are unique in that they are bank agnostic (the Hyper Gift Card BIN can be redeemed by anybody anywhere for either cash or goods and services). Hyper Gift Card BIN can change hands from one person to the next until redeemed. The Hyper Gift Card BIN is loaded into a range for access by the issuer. When the merchant is known as in a Bill Pay use, the Hyper Gift Card BIN can assign a name and the authorization code will be matched to the name loaded up request. Where the HGCB is intended to be like cash in the use of a peer-to-peer transaction, then the character of the HGCB will be like a prepaid debit card. In order for Hyper Gift Card BIN to be loaded, a consumer will need to load a special application that is capable of generating a readable or transferable code for redemption. The application will be able to recognize trusted devices for value transfer and the transfer will be processed using a tokenization format that will be secure. There is may be an agreement template and the consumer may need to register all of the cards into the wallet. The key here is that the payments repository is like a vault, i.e., the actual payment data never leaves the secure environment. Unlike all other wallets, Hyper Gift Card BIN uses virtual, tokenized and disposable card BINs and pseudo checking account numbers that can be discarded after a single use.

Branded Pay Card

The Branded Pay Card is linked to a device such as a mobile phone. The card has a smart chip which receives instruction from a mobile device based on the user selecting a brand for use for payment. The process flow in accordance with one embodiment of the present disclosure is described below. The user opens his mobile wallet or another container of information. The user selects the card brand that he or she wants to use for payment, e.g., a Visa, MasterCard or American Express. The Branded Pay Card receives notification from the phone indicating which card has been selected using any form of wireless communication or protocol. The Branded Pay Card is equipped with a receiver which could be a chip or another form of transfer protocol. The receiver determines the brand based on preloaded data forms which communicate to the internal brain which may be a semi-conductor or diode laser which illuminates the brand. Once the brand has been identified, the translucent card illuminates the brand as an exact replica including the card color and logo. The Branded Pay Card eliminates the commoditization of bank brands, which mobile wallets heretofore have threatened.

Branded Pay Card embodiments may utilize any suitable technology (e.g., holography) that captures the utility between the technological communication of the device to the Branded Pay Card, using any protocol which can successfully transfer the image and brand to the card for illumination and presentation. In some embodiments, the Branded Pay Card may hold a container such as a smart chip, QR code, bar code, magnetic stripe, near field communications (NFC) data stream, or other mechanism capable of transferring payment data.

FIG. 8 shows an exemplary graphical user interface (referred to herein as the "GUI 800") for an application, e.g., a mobile device application. The GUI 800 generally includes a user name field 805 and a last login field 810. In the exemplary embodiment shown in FIG. 8, the GUI 800 includes a graphical representation of selectable icons for the following set of features: My EFS (Electronic Financial System)Cash 815; EFS Cash 820; Account Summary 825; Transfer Activity 830; Scheduled Transfers 835; Search Friend & Family 840; EFS Gift 845; EFS Vault 850; EFS Portfolio 855; Bill Pay 860; and My Profile/Settings 865. GUI 800 may include additional, fewer, or different selectable icons depending upon a particular purpose.

My EFS Cash 815 can be used to view EFS cash balances. EFS Cash 820 can be used to send Electronic Currency. Account Summary 825 can be used to view a summary of Electronic Currency used for market exchange to buy and/or sell goods and services.

Transfer Activity 830 can be used to view a report of transfers requested from the user's EFS accounts. Scheduled Transfers 835 can be used to schedule transfers of Electronic Currency from the user's EFS accounts.

Search Friend & Family 840 can be used to select an intended recipient from a Facebook friend's list for receipt of a gift of Electronic Currency, Universal BIN Plastic Digital Card, or other electronic financial instrument. EFS Gift 845 can be used to fund a gift of Electronic Currency, Universal BIN Plastic Digital Card, or other electronic financial instrument.

EFS Vault 850 can be used to send money, in accordance with peer-to-peer send procedures. EFS Portfolio 855 can be used to view linked bank accounts and card information. Bill Pay 860 can be used to allow a customer to pay his or her bill using an online bill payment service. My Profile/Settings 865 can be used to customize account information, change password and/or pin, and/or other settings, e.g., alerts, sounds & icon badges for receiving notifications.

Although embodiments have been described in detail with reference to the accompanying drawings for the purpose of illustration and description, it is to be understood that the disclosed processes and apparatus are not to be construed as limited thereby. It will be apparent to those of ordinary skill in the art that various modifications to the foregoing embodiments may be made without departing from the scope of the disclosure.

What is claimed is:

1. A method comprising:
   receiving, from a first electronic device, a peer-to-peer payment request including a payment amount and a phone number, email address, or social network ID of a recipient;
   generating an invitation in response to receiving the peer-to-peer payment request, the invitation to be transmitted wirelessly to the phone number, email address, or social network ID of the recipient;
   receiving, from a second electronic device, an acceptance of the invitation and one or more items of new user information associated with the recipient;
   generating a digital payment card in the name of the recipient in response to receiving the acceptance and the new user information, the digital payment card including a card number pulled from a bank identification number (BIN) range; and,
   after said generating the digital payment card, crediting the payment amount to the recipient.

2. The method of claim 1 wherein said generating the digital payment card includes communicating the received peer-to-peer payment request and new user information to a payment processing platform and receiving the digital payment card from the payment processing platform.

3. The method of claim 2 wherein the payment processing platform includes the I2C platform.

4. The method of claim 1 wherein the digital payment card is reloadable.

5. The method of claim 4 further comprising:
   receiving, from the first electronic device, a token request including a cash amount; and
   generating a disposable digital card loaded with the cash amount in response to receiving the token request.

6. The method of claim 5 wherein said generating the disposable digital card includes communicating the received token request to a payment processing platform and receiving the disposable digital card from the payment processing platform.

7. The method of claim 6 wherein the payment processing platform includes the I2C platform.

8. A non-transitory computer readable medium storing instructions executable by a processor to perform operations comprising:
   receiving, from a first electronic device, a peer-to-peer payment request including a payment amount and a phone number, email address, or social network ID of a recipient;
   generating an invitation in response to receiving the peer-to-peer payment request, the invitation to be transmitted wirelessly to the phone number, email address, or social network ID of the recipient;
   receiving, from a second electronic device, an acceptance of the invitation and one or more items of new user information associated with the recipient;
   generating a digital payment card in the name of the recipient in response to receiving the acceptance and the new user information, the digital payment card including a card number pulled from a bank identification number (BIN) range; and,
   after said generating the digital payment card, crediting the payment amount to the recipient.

9. The non-transitory computer readable medium of claim 8 wherein said generating the digital payment card includes communicating the received peer-to-peer payment request and new user information to a payment processing platform and receiving the digital payment card from the payment processing platform.

10. The non-transitory computer readable medium of claim 9 wherein the payment processing platform includes the I2C platform.

11. The non-transitory computer readable medium of claim 8 wherein the digital payment card is reloadable.

12. The non-transitory computer readable medium of claim 11 wherein the operations further comprise:
    receiving, from the first electronic device, a token request including a cash amount; and
    generating a disposable digital card loaded with the cash amount in response to receiving the token request.

13. The non-transitory computer readable medium of claim 12 wherein said generating the disposable digital card includes communicating the received token request to a payment processing platform and receiving the disposable digital card from the payment processing platform.

14. The non-transitory computer readable medium of claim 13 wherein the payment processing platform includes the I2C platform.

15. A system comprising:
a first electronic device that wirelessly transmits a peer-to-peer payment request including a payment amount and a phone number, email address, or social network ID of a recipient;
one or more servers that receives the peer-to-peer payment request and generates an invitation in response to receiving the peer-to-peer payment request, the invitation to be transmitted wirelessly to the phone number, email address, or social network ID of the recipient; and
a second electronic device that receives the invitation and wirelessly transmits an acceptance of the invitation and one or more items of new user information associated with the recipient;
wherein the one or more servers receives the acceptance and the new user information, generates a digital payment card in the name of the recipient in response to receiving the acceptance and the new user information, and, after generating the digital payment card, credits the payment amount to the recipient;
wherein the digital payment card includes a card number pulled from a bank identification number (BIN) range.

16. The system of claim 15 wherein the one or more servers communicates the received peer-to-peer payment request and new user information to a payment processing platform and receives the digital payment card from the payment processing platform.

17. The system of claim 16 wherein the payment processing platform includes the I2C platform.

18. The system of claim 15 wherein the digital payment card is reloadable.

19. The system of claim 18 wherein:
the first electronic device wireless transmits a token request including a cash amount; and
the one or more servers receives the token request and generates a disposable digital card loaded with the cash amount in response to receiving the token request.

20. The system of claim 19 wherein the one or more servers communicates the received token request to a payment processing platform and receives the disposable digital card from the payment processing platform.

* * * * *